Figure 4:
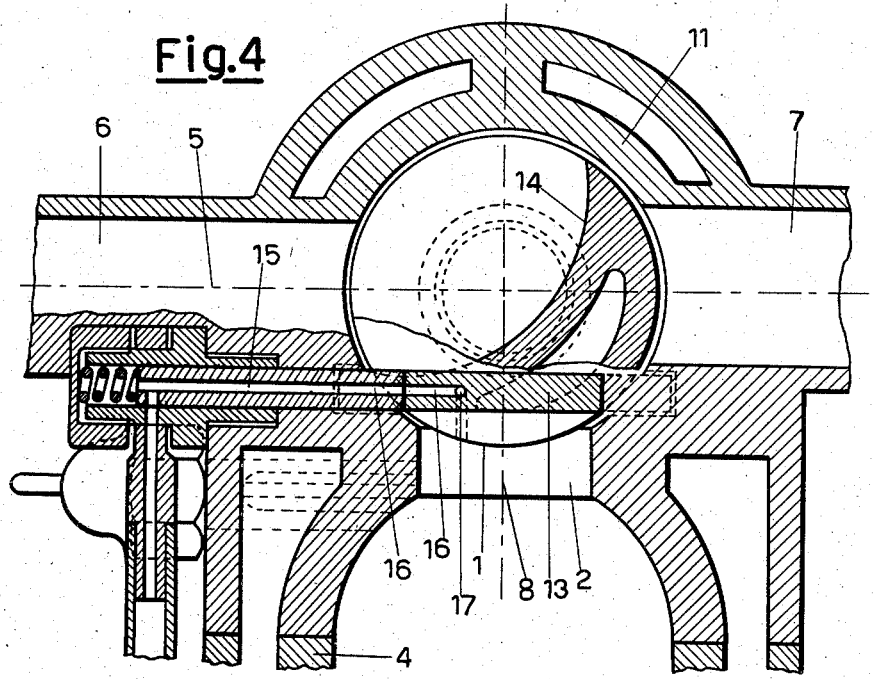

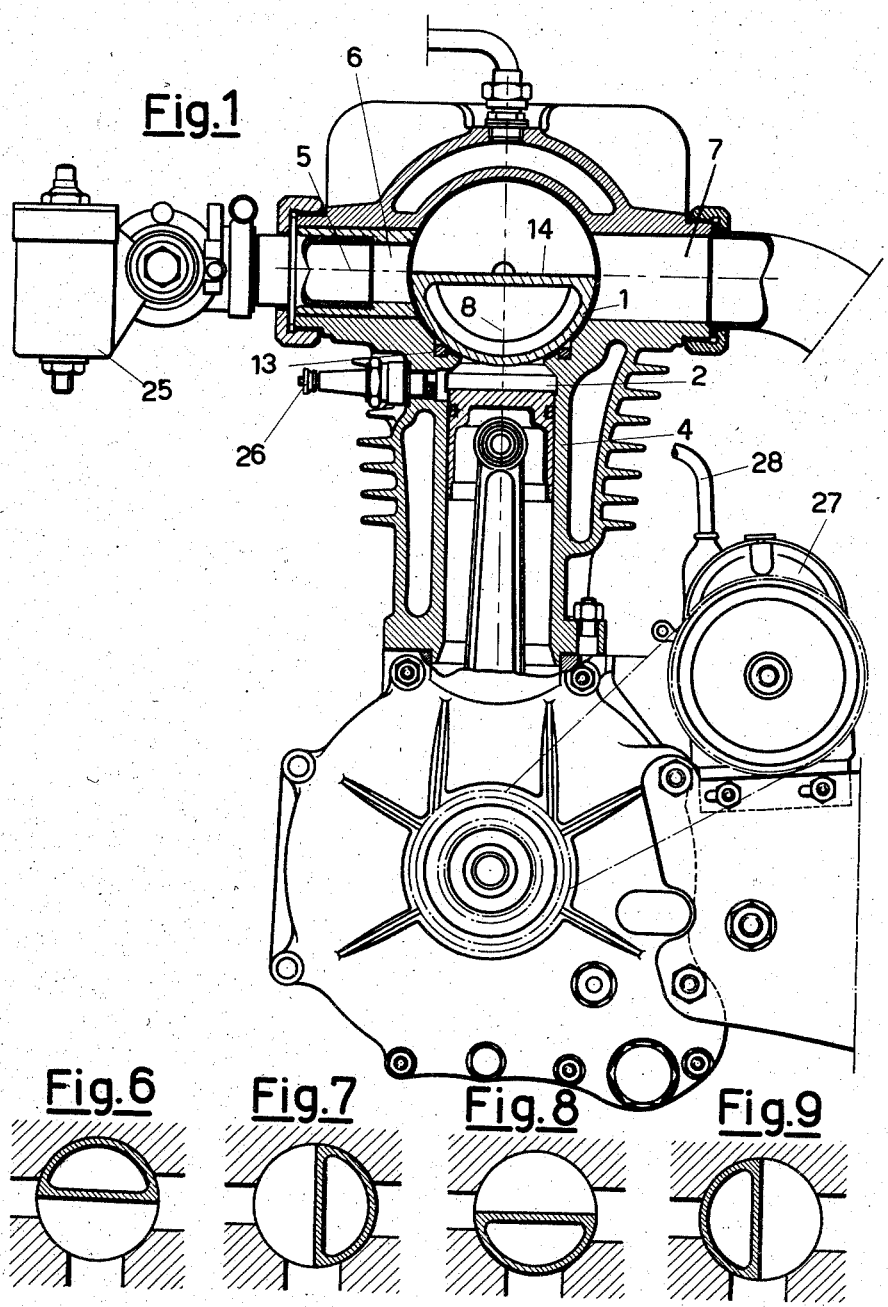

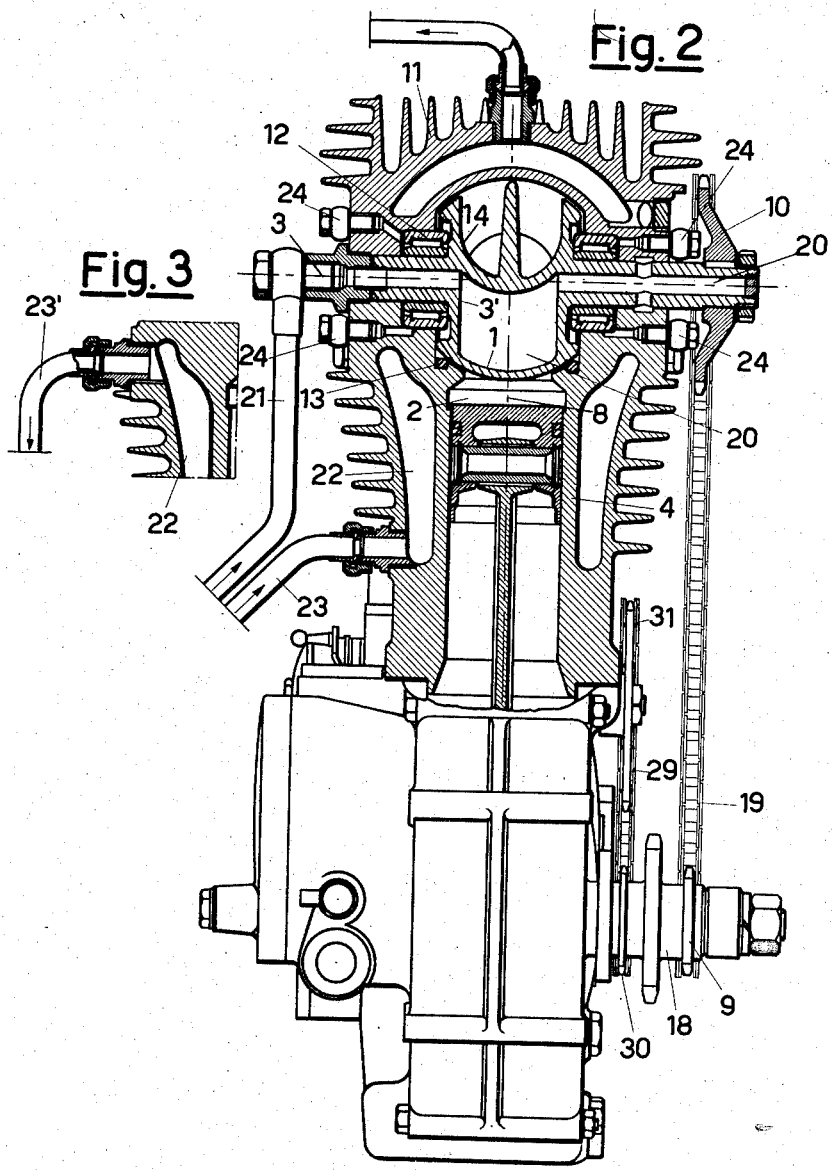

July 21, 1959 — A. SBAIZ — 2,895,459
THERMAL ENGINES, PARTICULARLY I.C. ENGINES
Filed July 11, 1955 — 3 Sheets-Sheet 3

United States Patent Office 2,895,459
Patented July 21, 1959

2,895,459

THERMAL ENGINES, PARTICULARLY I.C. ENGINES

Antonio Sbaiz, Milan, Italy

Application July 11, 1955, Serial No. 521,282

Claims priority, application Brazil July 23, 1954

1 Claim. (Cl. 123—80)

The present invention is related to improvements in thermal engines and particularly, in internal combustion engines.

More in particular, these improvements are concerned with the timing system, that is to say, the system with which the valve operation is associated so that the valves open and close in correct succession in the cylinders of the engine.

A first improvement according to the invention aims at replacing the presently adopted system by a single valve.

This mono-valve can be given a rotary motion, either continuous or intermittent and could consequently be called a "rotary-distributor."

It replaces the presently used valves in internal combustion engines, i.e. intake and exhaust valves, by putting into communication alternately the intake and exhaust conduits with the compression chamber of the cylinders of the engine, so as to be compatible with the distribution diagram of any engine whatsoever.

According to the present invention, the monovalve, during the movement required to effect the distribution diagram desired, is made leakproof by providing elastic means to effect close contact between the cooperating surfaces.

This result can be achieved by adopting an elastic ring having an annular sloping face intended to come into contact with a corresponding sloping surface of its seating, so that, owing to the expansion and shrinking of said ring, this latter is kept steadily in contact with the outer surface of the monovalve when said monovalve is moving. The leakproof contact with the outer surface of the moving monovalve can be also achieved by elastic or thermoelastic means acting on the surfaces intended to come into contact with the outer surface of the sliding monovalve.

The monovalve is constructed with suitable materials, preferably cast-iron, iron, steel and the like, and is cooled by circulating thereinto a fluid, e.g. water.

The present invention also relates to a fuel injection system which is intended to operate in connection with the rotary monovalve so as to allow substitution of said injection system, if desired, for the conventional carburetor.

By combining said injection system with the monovalve of the invention, rotary monovalve or distributor, a fine subdivision (atomization) of the sprayed fuel is obtained in the explosion chamber of the engine, so that the feed fuel is proportioned according to predetermined rates.

The aforementioned improvements can be practically applied in any type of thermal engine and particularly in internal combustion engines, explosion type or diesel, either two-stroke or four-stroke cycle, and also to internal combustion engines fed with crude oil and other types of engines.

The aforementioned valve or rotary distributor can be used also in steam engines and for other applications.

The following description will refer, by way of example only, to a preferred embodiment of the improvements of the invention, said embodiment referring particularly to an internal combustion 4-stroke cycle.

Figure 5:
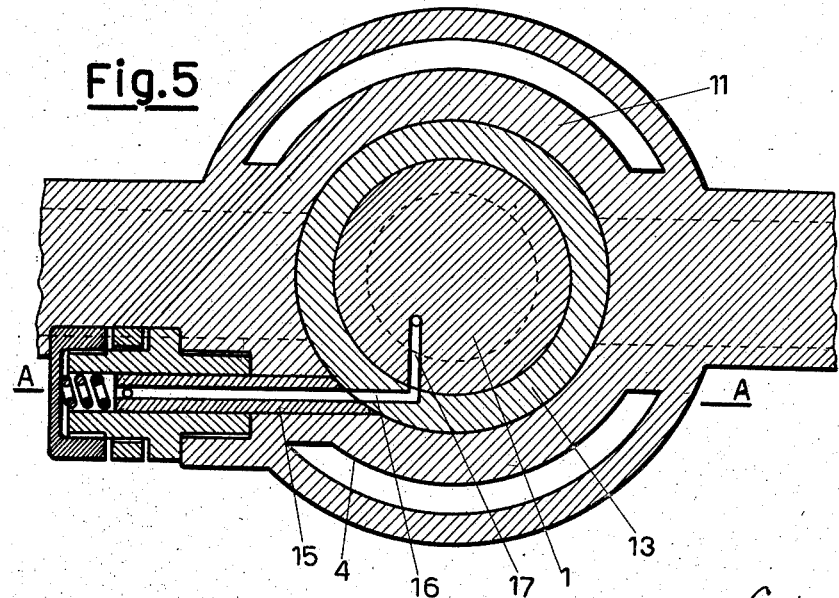

The accompanying drawings show, according to a diagrammatical representation, an engine, wherein:

Fig. 1 is a partial vertical cross-section.
Fig. 2 is a partial vertical longitudinal section.
Fig. 3 is a sectional view of a detail.
Fig. 4 shows the same engine to which an injection system has been applied according to the invention, said engine being shown in a section taken along line A—A of Fig. 5.
Fig. 5 is an horizontal section of Fig. 4, and
Figures 6, 7, 8 and 9 represent successive positions of the monovalve when it follows the various steps of the distribution diagram of the engine.

Reference being had to the above listed figures, wherein like parts correspond to like reference numerals, it should be understood that the monovalve (or rotary distributor) 1 is mounted, with respect to the explosion chamber 2 of cylinder 4, in the most suitable position according to the type of engine considered.

In the drawings the monovalve is shown mounted in the head (or upper part) of the cylinder 4, in the point in which the center lines cross, that is to say center line 3 of the pin 3' about which said valve turns, center line 5 of the air intake conduit 6 and of exhaust conduit 7, which conduits are aligned with respect to each other, and center line 8 of the common conduit (intake and outlet) communicating with the explosion chamber; center line 3 of pin 3', in fact, crosses the center line 5 of the air intake conduit 6 and outlet conduit 7 of the burnt-out gases, said conduits being the one opposite to the other; center line 5 and center line 3 lie in a same horizontal plane and in the point they cross each other, there is also the crossing point of the aforementioned center line with the vertical center line 8 of the cylinder and of the explosion chamber.

The monovalve (or rotary distributor), actuated by any suitable actuating means, e.g. a gear receiving at its turn the motion by motion-transmitting means driven by the shaft 18 or also by means of the chain 19 or other equivalent means and sprockets 9 and 10 mounted, respectively, on said shaft 18 and on pin 3' of the spherical monovalve 1, may be subjected to a continuous or alternate rotary motion according to the type of engine and, in the second instance, may rotate in the same sense or in alternate senses provided that, in a 4-stroke engine, two complete revolutions of the main shaft correspond to a complete cycle or revolution of the valve (or distributor).

The monovalve (or rotary distributor) 1 may have any suitable geometrical form, as for instance spherical, complete or not complete, conical or biconical and also cylindrical.

Should the monovalve be of spherical shape, it may have two or four opposite segments of a sphere inserted opposite to each other, the remainder of the spherical surface serving for other purposes. The valve, enclosed partly by the cylinder 4 and partly by the head 11 of the engine, said head having a shape suitable to contain the valve, can rotate about a pin 3' which can be a common one for all the cylinders or, according to the type of engine and the way in which the valves are actuated, each cylinder or group of cylinders may have a single pin for each valve. The pin will be borne by bearings 12 or ball bearings or roller bearings, suitably located.

The leakproof tightness of the monovalve (or rotary distributor) 1 during its motion is achieved by providing a close contact between the cooperating surfaces by elastical means so as to allow the monovalve to perform the preselected distribution diagram.

This result can be achieved by various tightness means, like for instance one or more gaskets, one or more rings 13, either rigid or flexible, solid or in segmental form, or split, of suitable shape and material, said tightness means being compelled, by natural springing or by thermal expansion or by variable forces acting in lateral direction or from below on said means or rings suitably located in the most convenient locations in the cooled parts of the cylinder, to ensure perfect tightness; said tightness means can be located in the movable part or valve proper or even in a fixed part, that is to say in the cylinder or cylinder head. An intermediate system can also be adopted, by employing the two types of mounting at the same time. As best shown in Figures 1 and 2, the sealing ring 13 is seated on a recess or shoulder provided within the cylinder 4 adjacent the upper end of the explosion chamber 2, said shoulder facing the chamber for the rotary valve 1.

The movable part, i.e. the valve (or rotary distributor) proper, is fitted with one or more openings, holes or pitted parts 14 in the body thereof suitably located and cut, said openings allowing the valve to effect the fuel intake and the discharge of burnt gases at correct intervals according to the preselected timing diagram, for any type of engine.

Pin 3' of the valve 1 and the valve proper have a longitudinally arranged chamber 20 along which a refrigerating fluid is circulated, the opposite ends being put in communication with a source of refrigerating fluid and with an outlet conduit through pipings 21.

In this way the valve (or rotary distributor) will be cooled not only by the customary system of putting it in contact with the cooled walls of the head and of the cylinder, but also by forced circulation of water, oil or other refrigerating fluid inside the valve itself, and, finally, one or more jets of fuel directly injected into the explosion chamber will cause an appreciable cooling.

Also the cylinder is cooled by circulating a refrigerating fluid in the jacket 22, said fluid being fed through pipings 23 and 23' (see Figures 2 and 3). Bearings 12 are cooled by circulating thereinto a fluid fed by suitable conduits through fittings 24 connected to their relative pipings.

To render the technical advantages of said valve (or rotary distributor) fully conspicuous, it is remarked herein that it is possible to provide gas intake and outlet ports having a diameter equal or even greater than the diameter of the cylinder, thus obtaining an efficiency higher than the one of the engines hitherto known, fitted with the conventional spring actuated valves. 25 is the carburetor, 26 is the sparking plug and 27 the magneto connected to the sparking plug by means of the cable 28: the mechanical connection between magneto 27 and the main shaft 18 is ensured by chain 29 (or equivalent means) and respective sprockets 30 and 31.

As aforementioned, the improvements according to the present invention relate also to a fuel injecting device which operates in connection with the valve so as to allow this injecting device to be substituted for the conventional carburetor.

The combination of said injecting device with the rotary valve allows the fine subdivision (atomizing) of the fuel spray in the explosion chamber of the engine, so that the feeding fuel can be supplied according to the correct ratios.

Said injection device is essentially formed of a pump, a distribution chamber (not shown) and of an injector proper.

The way in which the device operates is the following (refer to Figures 4 and 5):

The pump, which is a reciprocating pump, sucks the fuel from the reservoir and sends it to the distribution chamber which is a pressure resisting container fitted with valves, adapted to allow the feed back of the excess fuel in order to maintain a steady pressure inside said chamber, and with one or more distributing valves through which the fuel is fed, through one or more pipes, to the injector 15.

This injector, suitably located in the cylinder, is fitted with a jet or nozzle, bored to the desired size, which jet feeds the fuel to the explosion chamber of the cylinder, this feeding being intermittently admitted, so as to comply with the preselected distribution diagram, with the air admitted in the explosion chamber by the rotary valve.

The intermittent feeding in the injector may be effected by means of one or more small valves which, actuated by any suitable means, will inject at the correct time the necessary amount of fuel.

The passage of the fuel from the injector to the inside of the cylinder can be made, in the case in point, through the pin of the rotary valve or through the piston or also, as it is shown in the drawings (Figure 4 and 5) by direct injection which intervenes through a hole 16 bored in the elastic ring 13 and continues through a perforation 17 of the rotary valve; at the correct moment during the rotation of the valve, hole 16 and perforation 17 are aligned with respect to each other, according to the selected distribution diagram.

In Figs. 6 to 9, as aforesaid, the successive positions of the rotary valve are illustrated, according to the distribution diagram of the engine.

Fig. 6 shows the intake phase, Fig. 7 the compression phase, Fig. 8 the explosion phase and Fig. 9 the exhaust discharge phase.

The advantages arising from the improvements now described appendant to the rotary valve are the following:

(1) The conventional spring actuated valves may be dispensed with and consequently the dangers arising from breakage of said valves and subsequent falling thereof inside the cylinder are overcome because the rotary valve described affords the utmost safety in service.

(2) Ease of assembling and settling, with minimum consumption.

(3) Absolute lack of fire hazards due to back-fire before the end of the compression stroke.

(4) Possibility of sensibly increasing the efficiency of the engine due to the greater diameter it is possible to give to the inlet and outlet passages.

(5) The capacity of the explosion chamber can be reduced at will, so as to reach any desired compression rate without any danger that the piston may strike the valve, as it occurs with the internal combustion engines presently adopted having valves-in-head. In the latter case it was nearly always necessary to adopt side valves, and this fact hindered the adoption of high compression rates and put an obstacle to increasing the efficiency of the engines.

(6) Noticeably reduced cost of the engine in comparison with the presently adopted engines.

The combination of the rotary valve and of the injector affords the advantage of totally avoiding the conventional carburetor and the membrane pump, this latter rather difficult to set, and the further advantage of having in a cylinder one or more injectors so that the risk of being compelled to stop the engine due to carburation defect in a cylinder is overcome; this is of utmost importance in aircraft engines. The defect now mentioned may have a fatal consequence but with the system of the invention the greatest trouble which may occur when the injector of a cylinder is obstructed is that the incorrect operation or the interruption is limited to that cylinder only and not to the whole engine, for the other cylinders will continue to operate.

The body of the rotary valve may have one or more holes or pitted parts and this may be of avail in order to reduce the number of revolutions of the rotary valve with respect to the number of revolutions of the engine.

The pitting in the sphere or hemisphere may be shaped as shown in the drawing or an inclined or transverse hole may also be provided.

The valve may have a continuous or alternate rotary motion.

The tightness rings may have the shape represented in the drawings or conical or biconical shape or other forms of the external part and solid rings or split rings may be used (like piston rings); and also a combination of solid rings with split rings.

One of the tightness rings may have any height, it may be higher than the cylinder or less high than the cylinder or of height equal to the one of the cylinder; it may be introduced in the cylinder and forced by suitable means against the rotary valve.

The rotary valve may serve also as crankshaft, with or without counterpoising masses, which crankshaft will replace the crankshaft and flywheels as presently adopted in the engines of various type, thus allowing an increase in the compression ratio in 2-stroke engines and in 4-stroke engines as well, thus decreasing both weight and cost.

Lubrication is effected by splashing or forced lubrication through solid or split ring and also through the rotary valve, or the cylinder, or the head and, further, also by spraying the lubricant from inside or outside the cylinder or head.

The rotary valve (rotary distributor) can be used for steam engines, internal combustion engines, external combustion engine or engines with any type of fuel feeding.

The spherical valve can have its axis horizontal as shown in the drawing or in any other position, e.g. parallel to the sense in which the piston slides, and borne by one or more bearings.

Among the other advantages afforded by the rotary valve of the invention is that the beginning of the intake intervenes through a passageway the width of which is proportional to the depression of the piston, thus giving a favourable air stream without whirls.

At the end of the suction stroke the valve itself guides the air stream into the outlet passage, thus causing a scavenging, condensing the hot burnt gases, cooling the walls of the outlet conduits and affecting, thanks to the cold air stream formed, the subsequent exhaust. Thus the unfavourable whirling motions experienced with the conventional valves are avoided.

The obstacle constituted by the conventional spring actuated valves in the presently adopted engines is overcome, as the air intake and exhaust conduits may have a diameter equal to the one of the cylinder or even greater and the horse-power of the engine is consequently increased.

What I claim is:

In an internal combustion engine, including a cylinder provided with an internal combustion chamber and a head at the upper end thereof, said head and said cylinder having a valve chamber therein opening into said combustion chamber, said head and said cylinder having aligned inlet and exhaust passages disposed transversely of the cylinder and intersecting said valve chamber for the intake of air and the exhausting of gases, a rotary valve rotatably mounted in the valve chamber, a shaft rotatably mounted in the cylinder transverse thereto and positioned at right angles to the passages and on which said valve is fixed, said valve having a surface cavity formed therein to permit communication selectively between said inlet passage and said combustion chamber and between said combustion chamber and said exhaust passage, said valve having also a surface portion closing off said combustion chamber from said valve chamber, the improvement which comprises a recessed shoulder in said cylinder adjacent the upper end of said combustion chamber and opening into said valve chamber, and a sealing ring seated on said recessed shoulder for contacting the surface portion of said rotary valve when said valve is in position to close off said combustion chamber from said valve chamber, said cylinder being provided with a first fuel passage extending laterally therethrough and terminating adjacent said sealing ring, said sealing ring being provided with a second fuel passage extending laterally therethrough and communicating with said first fuel passage, the surface portion of said rotary valve shutting off communication between said combustion chamber and said valve chamber being provided with a third passageway which, when said rotary valve is in position for preventing communication between said combustion chamber and said valve chamber, communicates with said second fuel passage and said combustion chamber, whereby fuel may be injected into said combustion chamber through said three fuel passages when said combustion chamber is closed by said rotary valve.

References Cited in the file of this patent

UNITED STATES PATENTS

| | | |
|---|---|---|
| 1,128,757 | Chandler | Feb. 16, 1915 |
| 1,139,101 | Chandler | May 11, 1915 |
| 1,187,343 | Lane | June 13, 1916 |
| 1,893,855 | Baer | Jan. 10, 1933 |
| 2,048,134 | Montalto | July 21, 1936 |
| 2,587,842 | Hall | Mar. 4, 1952 |
| 2,725,043 | Bacot | Nov. 29, 1955 |

FOREIGN PATENTS

| | | |
|---|---|---|
| 970,264 | France | June 14, 1950 |